Oct. 25, 1955 H. WEISBERGER ET AL 2,721,946
BATTERY SUPPLIED RADIO RECEIVERS
Filed Feb. 5, 1953
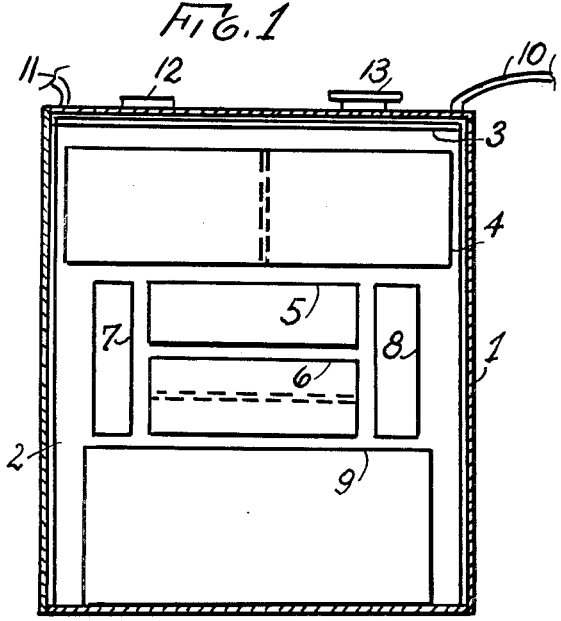
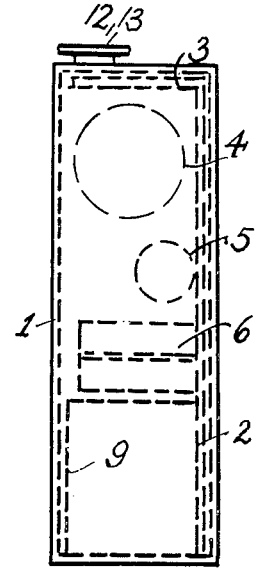
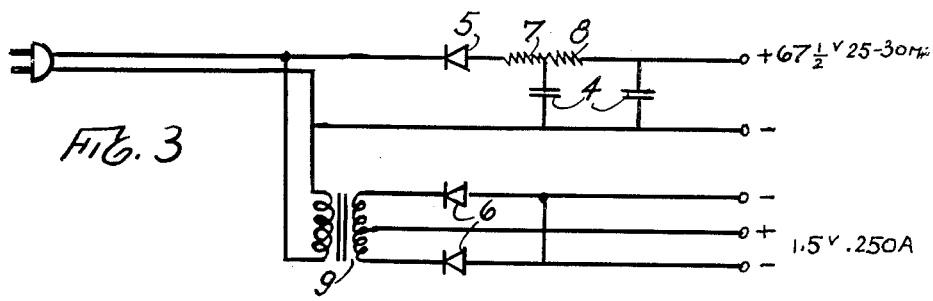
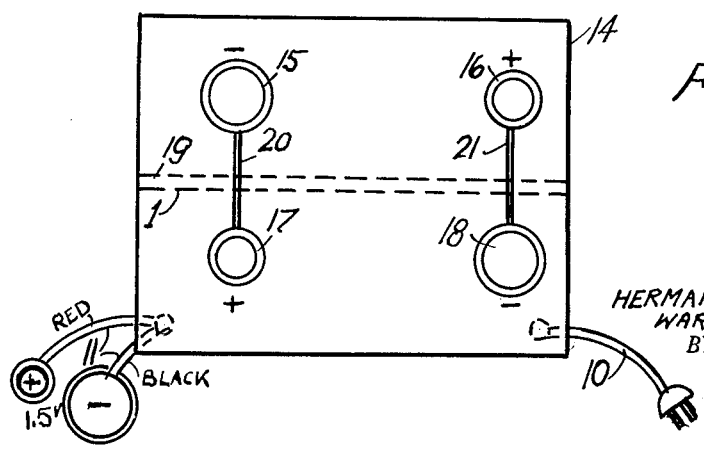
INVENTORS.
HERMAN WEISBERGER AND
WARREN J. OESTREICHER
BY
Theodore Hafner
ATTORNEY

United States Patent Office 2,721,946
Patented Oct. 25, 1955

2,721,946
BATTERY SUPPLIED RADIO RECEIVERS

Herman Weisberger, Brooklyn, and Warren J. Oestreicher, Flushing, N. Y., assignors to Electronic Devices, Inc., a corporation of New York Application February 5, 1953, Serial No. 335,272

3 Claims. (Cl. 307—43)

This invention relates to battery supplied electronic apparatus, especially radio receivers.

One of the objects of the invention is to permit changeover from battery supply to mains supply with a minimum of operations and/or accessories.

Another object of the invention is to provide an accessory unit adaptable to any existing battery supplied radio or any other battery operated electronic receiver and permitting connection and operation of such receiver from the mains.

A further object of the invention is an accessory unit having the form of a standard high-voltage or plate battery to take the place of that plate battery in a corresponding receiver and to permit connection of the receiver—usually supplied by battery—to an outside or main soure of power.

Still another object of the invention is to permit replacement of the battery in an electronic receiver by a mains supply and also recharging of that battery from the unit.

These and other objects of the invention will be more fully understood from the drawings annexed herewith in which:

Figs. 1 and 2 show in side and front views respectively (the latter in section), an accessory unit embodying certain features of the invention.

Fig. 3 shows a corresponding electrical circuit diagram.

Fig. 4 shows a further accessory element permitting the use of the unit shown in Figs. 1 and 2 as a battery charger.

In Figs. 1 and 2 a case of card or fibre board having the shape of a standard 67½ volt high voltage or plate battery and schematically indicated at 1, has supported therein another cardboard structure consisting of two perpendicular plates or panels 2, 3. Vertical panel 2 supports the elements of power supply or converter unit, including a pair of electric filter condensers 4, a rectifier 5, a pair of series connected selenium rectifiers 6, a pair of resistances 7, 8 of 5 and 4700 ohms respectively, and a transformer 9, all interconnected in a manner shown in the diagram of Fig. 3.

Cable 10 permits correction of unit 1 to the A. C. mains or a source of say 110 volt A. C., usually available at home or in the office to supply the required high voltage or "B" power to the receiver.

Another cable 11 serves to supply "A" power by being connected to the existing 1.5 volt cell, which thus serves as a filter while being kept charged.

Terminals 12, 13 which are identical with the usual terminals of the plate battery of the type shown in Figs. 1, 2 are attached to the horizontal panel 3 and permit the entire unit 1 to be inserted or placed into a battery supplied radio receiver (not shown) and in the space usually reserved to receive a standard "B" or 67½ volt plate battery.

In order to operate unit 1, it is only necessary to place unit 1 into "B" battery compartment, place the red wire of cable 11 over "A" cell cap and the black wire of cable 11 over "A" cell base.

In this way it will be possible to connect that radio receiver to the 110 A. C. mains in exactly the same manner as the corresponding battery replaced by it and to operate a radio receiver from the main source with a minimum of changes and operations.

Unit 1 in accordance with the invention can also be used as a battery charger as apparent from Fig. 4. In this case a connection panel 14 having four terminals 15, 16, 17, 18 all of the same shape and arrangement as in the standard battery concerned, is placed on top of unit 1, such as shown in Fig. 1, also on top of the standard battery 19 to be charged. By connecting the unit 1 to the A. C. mains, battery 19 will be charged and prepared for further use.

In order to permit such charging opposing terminals on panel 14 are interconnected as apparent from Fig. 4 through lines 20 and 21.

The invention is of course not limited to the type, form and connection of elements shown and described.

The unit may be made of round-cylindrical shape to conform for example with the pencil type shape of a hearing aid battery and may thus be used with battery supplied hearing aid receivers.

It can also be applied to filament batteries or to combined filament and high voltage batteries, and to batteries of any desired voltage or voltages, and of any desired type, whether dry or wet, and rechargeable or not.

Nor is it limited to the connection of a unit to A. C. mains supply but easily adaptable to D. C. supply or to both A. C. and D. C. connections.

We claim:

1. In combination, a casing substantially of the form of a rectangular parallelepiped substantially extending in one plane to a greater extent than in a direction perpendicular thereof, terminals arranged along a small side of said parallelepiped, means including a cable extending from the inside to the outside of said casing for supplying alternating current and means supported in said casing and connected to said cable to transform the current supplied to said cable from the outside into a direct current including means for transforming the voltage of said supplied current into a direct current voltage different from said supplied voltage, a switch panel having four terminals interconnected to produce a battery charging voltage and adapted for operation to be placed on the top of said casing and extending beyond the top of said casing for approximately the same surface as is covered by said casing so that another casing of substantially similar size may be placed under said switch panel to permit the connection of said second casing by said switch panel.

2. Combination according to claim 1 comprising a second cable extending from the outside to the inside of said casing and an inside source of electric power connected to said second cable.

3. Combination according to claim 1 wherein said transforming means include circuit elements and connections, all supported on the wide side of said casing.

References Cited in the file of this patent

UNITED STATES PATENTS

| 1,623,628 | Lovejoy | Apr. 5, 1927 |
| 1,934,692 | Bellamy | Nov. 14, 1933 |
| 1,954,931 | Hambuechen | Apr. 17, 1934 |
| 2,028,191 | Cherton | Jan. 21, 1936 |
| 2,127,488 | Andrews | Aug. 16, 1938 |
| 2,176,447 | Vilkomerson | Oct. 17, 1939 |
| 2,229,729 | Emde | Jan. 28, 1941 |
| 2,253,131 | MacGregor | Aug. 19, 1941 |
| 2,265,544 | Peters | Dec. 9, 1941 |
| 2,353,461 | Hamann | July 11, 1944 |
| 2,453,612 | Aust | Nov. 9, 1948 |
| 2,473,194 | Chou | June 14, 1949 |
| 2,485,450 | Kotterman | Oct. 18, 1949 |
| 2,490,427 | Gilson et al. | Dec. 6, 1949 |
| 2,590,805 | Vitale | Mar. 25, 1952 |